(12) United States Patent
Deb et al.

(10) Patent No.: US 8,751,285 B2
(45) Date of Patent: Jun. 10, 2014

(54) SYSTEM AND METHOD FOR CALCULATING A RISK TO AN ENTITY

(75) Inventors: Subhajit Deb, Haryana (IN); William Tyler Thornhill, Forney, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/363,825

(22) Filed: Feb. 1, 2012

(65) Prior Publication Data

US 2013/0197963 A1 Aug. 1, 2013

(51) Int. Cl.
*G06Q 10/00* (2012.01)
*G06Q 40/00* (2012.01)

(52) U.S. Cl.
USPC ........................ 705/7.28; 705/7.11

(58) Field of Classification Search
USPC .............................. 705/7.11–7.42
See application file for complete search history.

(56) References Cited

U.S. PATENT DOCUMENTS

| 7,644,026 | B2 * | 1/2010 | Cohen et al. | 705/36 R |
| 7,734,526 | B2 * | 6/2010 | Howard et al. | 705/36 R |
| 2004/0128186 | A1 * | 7/2004 | Breslin et al. | 705/10 |
| 2005/0091076 | A1 * | 4/2005 | McGovern | 705/1 |
| 2008/0071702 | A1 * | 3/2008 | Howard et al. | 705/36 R |
| 2008/0103962 | A1 * | 5/2008 | Cohen et al. | 705/38 |

OTHER PUBLICATIONS

Frey, Bruno, et al., Calculating Tragedy: Assessing the Costs of Terrorism, Institute for Empirical Research in Economics, University of Zurich, ISSN 1424-0459, Sep. 2004.*
Gerd Hagmeyer-Gaverus & Mikael Weissmann, "*Early Warning Indicators for Preventive Policy—a new approach in Early Warning research*", an Internet-Based Early Warning Indicators System for Preventive Policy, Stockholm Int'l Peach Research Institute (sipri), http://projects.sipri.org/ewi/; (9 pgs), Mar. 2003.
Country Risk Analyst, "HIS Global Insight: Country & Industry Forecasting"; http://www.ihs.com/projects/global-insight/country-analysis/risk-analyst.aspx; (2 pgs), last printed Oct. 26, 2011.
Renato Donatello Ribeiro, GWU—IBI—Minerva Program, "Country Risk Analysis", last printed Oct. 19, 2011.

* cited by examiner

*Primary Examiner* — Justin M Pats
*Assistant Examiner* — Amber A Misiaszek
(74) *Attorney, Agent, or Firm* — Michael A. Springs (57) ABSTRACT

According to one embodiment, a system includes a memory, a processor, and an interface. For a first region, the processor calculates a risk associated with a political situation of the first region, a risk associated with a legal situation of the first region, a risk associated with an economic situation of the first region, a risk associated with a social situation of the first region, a risk associated with a technological situation of the first region, and a risk associated with an environmental situation of the first region. For a first entity, the processor calculates a risk associated with an exposure level of the first entity in the first region. Based at least on these calculated risks, the processor calculates a ranking for the first region, the ranking representing an amount of risk to the first entity in the first region. The interface communicates the ranking for display.

17 Claims, 6 Drawing Sheets

FIG. 1

| AREA | COUNTRY | POLITICAL SITUATION RISK | LEGAL SITUATION RISK | ECONOMIC SITUATION RISK | SOCIAL SITUATION RISK | TECHNOLOGICAL SITUATION RISK |
|---|---|---|---|---|---|---|
| AMERICAS | CANADA | 1.2 | 1 | 2 | 1.5 | 1 |
| ASIA | SINGAPORE | 1.2 | 1 | 1 | 1.25 | 1.2 |
| ASIA | SAUDI ARABIA | 1.8 | 1.4 | 1.2 | 1.5 | 1.6 |
| ASIA | JAPAN | 1.6 | 1.4 | 1 | 1 | 1.2 |
| ASIA | MALAYSIA | 1.6 | 2 | 1.6 | 1.75 | 1.8 |
| ASIA | TAIWAN (REPUBLIC OF CHINA) | 3.2 | 1.8 | 1.8 | 1.5 | 1.2 |
| ASIA | REPUBLIC OF KOREA | 2.6 | 3 | 1.8 | 1.5 | 1.2 |
| ASIA | CHINA | 3.6 | 3 | 2.2 | 2.75 | 3.2 |
| ASIA | INDIA | 3.4 | 2 | 1.4 | 1.5 | 1.4 |
| ASIA | INDONESIA | 3.6 | 2 | 1.8 | 2 | 2 |
| ASIA | THAILAND | 2.6 | 2 | 1.4 | 2 | 2 |
| ASIA | IRAN | 3 | 2.8 | 2.6 | 2.5 | 2.8 |
| ASIA | ISRAEL | 2.6 | 1.6 | 1.8 | 1.75 | 1.2 |
| ASIA | PAKISTAN | 3.6 | 3 | 2.6 | 3 | 2.8 |
| ASIA | UAE | 2 | 1.2 | 1.2 | 1.25 | 1.2 |
| ASIA | PHILIPPINES | 2.8 | 2.2 | 2.2 | 2.25 | 3 |

| ENVIRONMENTAL SITUATION RISK | EXPOSURE LEVEL OF AN ENTITY IN THE REGION ||||| CALCULATED EXPOSURE LEVEL |
| --- | --- | --- | --- | --- | --- | --- |
| | CRITICALITY | DATA CENTER/CRITICAL LOCATION | ASSOCIATE POPULATION | NUMBER OF LINES OF BUSINESS | REGULATORY/ CUSTOMER NOTIFICATION | |
| 1 | HIGH | MED | HIGH | HIGH | LOW | 3 |
| 1.2 | MED | HIGH | HIGH | HIGH | MED | 3.2 |
| 1.6 | HIGH | LOW | LOW | LOW | LOW | 1.6 |
| 1.2 | HIGH | HIGH | HIGH | HIGH | MED | 3.6 |
| 1.8 | LOW | HIGH | LOW | MED | MED | 2 |
| 1.2 | LOW | LOW | MED | MED | MED | 1.6 |
| 1.2 | MED | LOW | LOW | LOW | MED | 1.4 |
| 3.2 | HIGH | HIGH | MED | HIGH | MED | 3.2 |
| 1.4 | HIGH | HIGH | HIGH | HIGH | MED | 3.6 |
| 2 | LOW | LOW | LOW | LOW | MED | 1.2 |
| 2 | LOW | LOW | LOW | LOW | LOW | 1.2 |
| 2.8 | MED | LOW | LOW | LOW | LOW | 1.2 |
| 1.2 | LOW | LOW | LOW | LOW | LOW | 1 |
| 2.8 | LOW | LOW | LOW | MED | LOW | 1 |
| 1.2 | HIGH | LOW | MED | MED | LOW | 2 |
| 3 | HIGH | LOW | MED | MED | MED | 2.2 |

ABSTRACT# SYSTEM AND METHOD FOR CALCULATING A RISK TO AN ENTITY

TECHNICAL FIELD

This disclosure relates generally to the field of risk calculation and more specifically to a system and method for calculating a risk to an entity.

BACKGROUND

In order to determine a risk to an entity in a region, the region is typically analyzed based on a particular feature. For example, if the entity is a financial institution, the region may typically be analyzed based on only the economic situation of the region. As such, the typical systems and methods for calculating the risk to an entity in a region are deficient.

SUMMARY OF THE DISCLOSURE

According to one embodiment, a system includes a memory, a processor, and an interface. For a first region, the processor calculates a risk associated with a political situation of the first region, a risk associated with a legal situation of the first region, a risk associated with an economic situation of the first region, a risk associated with a social situation of the first region, a risk associated with a technological situation of the first region, and a risk associated with an environmental situation of the first region. For a first entity, the processor calculates a risk associated with an exposure level of the first entity in the first region. Based at least on these calculated risks, the processor calculates a ranking for the first region, the ranking representing an amount of risk to the first entity in the first region. The interface communicates the ranking for display.

Certain embodiments of the disclosure may provide one or more technical advantages. For example, a ranking that represents an amount of risk to the entity in the region may be calculated based on a risk associated with an exposure level of the entity in the region. Therefore, the ranking for the region may be based on the entity's existing infrastructure in the region. Furthermore, the calculation of the ranking for the first region may also be based on one or more specifics of the entity, itself. As another example, the calculation of the ranking that represents an amount of risk to the entity in the region may further be based on risks associated with each of a political situation of the region, a legal situation of the region, an economic situation of the region, a social situation of the region, a technological situation of the region, and an environmental situation of the region. As such, the ranking may be based on more than one situation type of the region, providing a more balanced analysis of the region. As a further example, based on the calculated risks for a plurality of regions, a comparison of the rankings of each of the regions (or a comparison of one or more calculated risks of each of the plurality of regions) may be determined and communicated for display to a user. As such, the user may be able to view and analyze a comparative analysis of the rankings of each of the regions and/or of the calculated risks of each of the regions (such as a comparative analysis of the risk associated with a political situation or an economic situation for each of the plurality of regions).

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION OF THE DRAWINGS

Embodiments of the present disclosure are best understood by referring to FIGS. 1 through 5 of the drawings, like numerals being used for like and corresponding parts of the various drawings.

Figure 1:
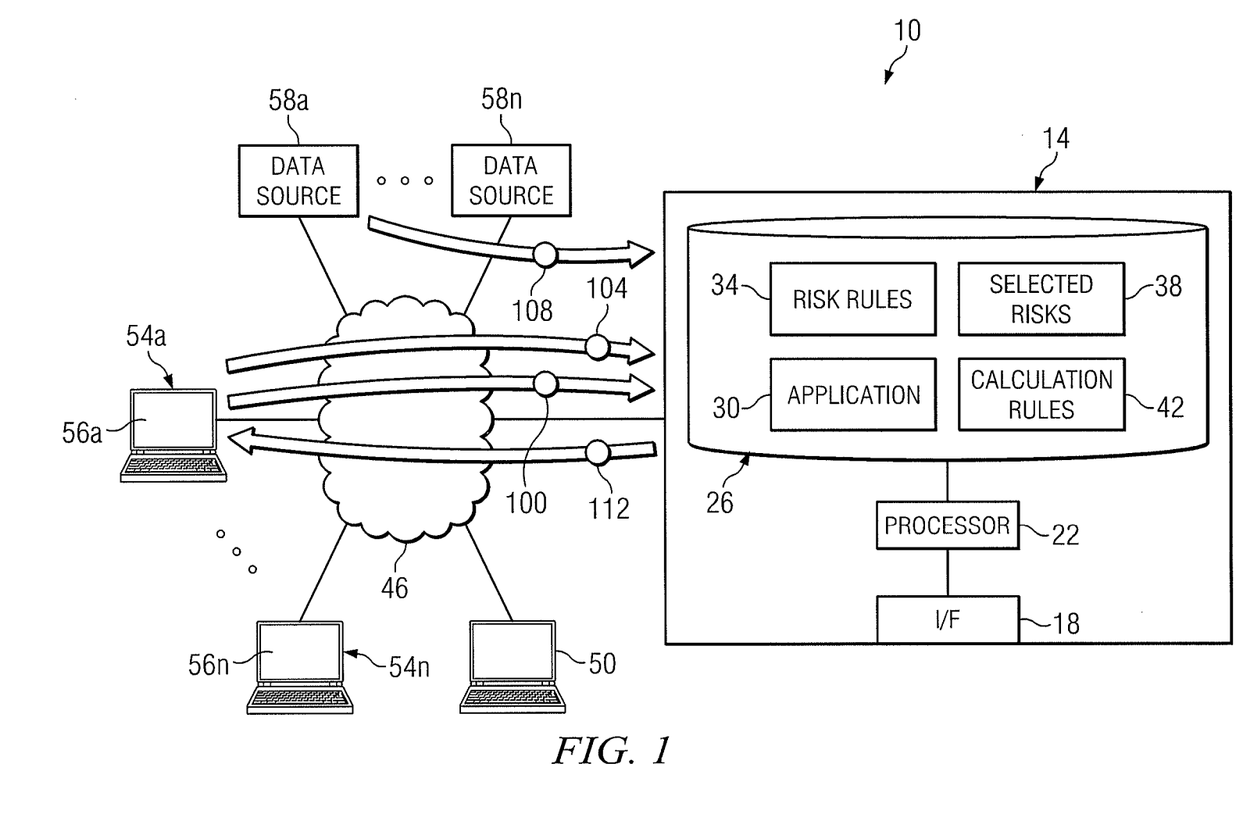
FIG. 1 illustrates a system for calculating the risk to an entity in one or more regions.

FIG. 1 illustrates a system 10 for calculating the risk to an entity in one or more regions. System 10 includes a calculation device 14 that calculates the risk to the entity in one or more regions. For example, calculation device 14 may calculate risks to the entity based on a political situation, a legal situation, an economic situation, a social situation, a technological situation, an environmental situation, or any suitable combination of the preceding. Furthermore, calculation device 14 may further calculate a risk associated with an exposure level of the entity in the region. Based on each of these calculated risks, calculation device 14 may calculate a ranking for the region. Such a ranking may represent an amount of risk to the entity in the region. In particular embodiments, the calculations conducted by calculation device 14 may allow a user to understand and mitigate current and future threats to the entity. Furthermore, the calculations may help a user understand the market growth or decline, business position, potential for operations of the entity, and/or direction for operations of the entity.

An entity represents any suitable entity that may be located in a region, may be traveling to a region, may be conducting business in a region, or may be associated (either currently or in the future) with a region. For example, the entity may include a person, a business, a corporation, a financial institution (e.g., such as a bank), or any other suitable entity.

A region represents any geographical area. For example, a region may represent a town, a plurality of towns, a city, a plurality of cities, a state, a plurality of states, a country, a plurality of countries, a continent, a plurality of continents, or any other suitable geographical area.

In order to determine a risk to an entity in a region, the region is typically analyzed based on one or more features. For example, if the entity is a financial institution, the region may typically be analyzed based on only the economic situation of the region. Such analysis, however, does not provide a full picture of the current and future threats to the entity. In particular, although the economic situation of a region may be important to an entity (such as a financial institution), other situation types may also be important to that entity, but may not typically be analyzed. For example, situation types like the political situation, the legal situation, the social situation, the technological situation, and the environmental situation may also be important to the entity, but may not be typically analyzed. In addition to not analyzing a region based on various situation types that may be important to the entity, such typical analysis also does not take into account an entity's existing infrastructure in the region. For example, a typical analysis may not take into account the fact that the entity is already located in the region and conducting business in the region. As such, the typical systems and methods for calculating the risk to an entity in a region may be deficient.

In particular embodiments, system 10 of FIG. 1 may calculate the risk to an entity in a region in a manner that may provide various advantages. For example, a ranking that represents an amount of risk to the entity in the region may be calculated based on a risk associated with an exposure level of the entity in the region. Therefore, the ranking for the region may be based on the entity's existing infrastructure in the region. Furthermore, the calculation of the ranking for the first region may also be based on one or more specifics of the entity, itself. As another example, the calculation of the ranking that represents an amount of risk to the entity in the region may further be based on risks associated with each of a political situation of the region, a legal situation of the region, an economic situation of the region, a social situation of the region, a technological situation of the region, and an environmental situation of the region. As such, the ranking may be based on more than one situation type of the region, providing a more balanced analysis of the region. As a further example, based on the calculated risks for a plurality of regions, a comparison of the rankings of each of the regions (or a comparison of one or more calculated risks of each of the plurality of regions) may be determined and communicated for display to a user. As such, the user may be able to view and analyze a comparative analysis of the rankings of each of the regions and/or of the calculated risks of each of the regions (such as a comparative analysis of the risk associated with a political situation or an economic situation for each of the plurality of regions).

Calculation device 14 represents any components that calculate a risk to an entity in one or more regions. Calculation device 14 may include a network server, any remote server, a mainframe, a host computer, a workstation, a web space server, a personal computer, a file server, or any other device operable to calculate the risk to an entity in one or more regions. The functions of calculation device 14 may be performed by any combination of one or more servers or other components at one or more locations. In the embodiment where the module is a server, the server may be a private server, and the server may be a virtual or physical server. The server may include one or more servers at the same or remote locations. Also calculation device 14 may include any component that functions as a server. In the illustrated embodiment, calculation device 14 includes a network interface 18, a processor 22, and a memory 26.

Network interface 18 represents any device operable to receive information from network 46, transmit information through network 46, perform processing of information, communicate to other devices, or any combination of the preceding. For example, network interface 18 may receive information from a data source 58. As another example, network interface 18 may communicate a ranking for a region for display on a user device 54. Network interface 18 represents any port or connection, real or virtual, including any suitable hardware and/or software, including protocol conversion and data processing capabilities, to communicate through a local area network (LAN), a metropolitan area network (MAN), a wide area network (WAN), or other communication system that allows calculation device 14 to exchange information with network 46, administration device 50, user devices 54, data sources 58, or other components of system 10.

Processor 22 communicatively couples to network interface 18 and memory 26, and controls the operation and administration of calculation device 14 by processing information received from network interface 18 and memory 26. Processor 22 includes any hardware and/or software that operates to control and process information. For example, processor 22 executes calculation device management application 30 to control the operation of calculation device 14. Processor 22 may be a programmable logic device, a microcontroller, a microprocessor, any processing device, or any combination of the preceding.

Memory 26 stores, either permanently or temporarily, data, operational software, or other information for processor 22. Memory 26 includes any one or a combination of volatile or non-volatile local or remote devices suitable for storing information. For example, memory 26 may include random access memory (RAM), read only memory (ROM), magnetic storage devices, optical storage devices, or any other information storage device or a combination of these devices. While illustrated as including particular modules, memory 26 may include any information for use in the operation of calculation device 14.

In the illustrated embodiment, memory 26 includes calculation device management application 30, risk rules 34, selected risks 38, and calculation rules 42. Calculation device management application 30 represents any suitable set of instructions, logic, or code embodied in a computer readable storage medium and operable to facilitate the operation of calculation device 14.

Risk rules 34 represent any information that may be used to calculate a risk associated with a factor of a situation type of a region. For example, as is discussed above, each region may have various situation types, such as a political situation, a legal situation, an economic situation, a social situation, a technological situation, and/or an environmental situation. Furthermore, each of the situation types of the region may include a plurality of factors that may be used to calculate the risk associated with the situation type of the region. As an example, for the political situation of a region, the factors that may be used to calculate the risk associated with the political situation of the region may include a factor regarding corruption in the region, a factor regarding terrorism in the region, a factor regarding organized crime in the region, a factor regarding weaponry in the region, and/or a factor regarding a geo-political conflict in the region.

As is discussed above, risk rules 34 may represent any information that may be used to calculate risks associated with the factors for the situation type of the region. For example, based on information received from data sources 58, processor 22 may use one or more risk rules 34 in order to calculate that there is a low risk of corruption in the region. Risk rules 34 may include any suitable rule. For example, risk rules 34 may provide that a region has a low risk for corruption when there is little to no information regarding corruption in the region, when information from data sources 58 indicates that there is a low risk of corruption in the region, when corruption (or indicators of corruption) is mentioned infrequently in the information received from data sources 58, or upon the occurrence of any other event that indicates that there is a low risk of corruption in the region. A further example of risk rules 34 is discussed below.

In the illustrated embodiment, risk rules 34 may be provided to calculation device 14 by administration device 50. For example, a user (such as an administrator) using the administration device 50 may create each of the risk rules 34 and may transmit them to calculation device 14 in order to be used to calculate risks associated with the factors for the situation type of the region.

Selected risks 38 represent any information regarding a selected risk for a factor for a situation type in the region. For example, if a factor for the political situation in the region is the risk of corruption in the region, selected risk 38 may include a selection of "low risk" for corruption in the region. According to the illustrated embodiment, selected risk 38 may be based on a selection made by a user and/or device of system 10. For example, a user who has knowledge of the region may determine that there is a low risk for corruption in the region (based on his own knowledge and/or documents/reports that he has received regarding the region), and may provide the selection of "low risk" for corruption in the region. In particular embodiments, selected risks 38 may include selections received from administration device 50, user devices 54, data sources 58, and/or any other suitable device of system 10. In particular embodiments, if a factor for a situation type for a region has a selected risk 38, a risk for that factor may not be calculated by processor 22. Instead, processor 22 may use the selected risk 38 for that factor.

Calculation rules 42 represent any information that may be used to calculate a risk associated with a situation type for a region, calculate a risk associated with an exposure level of the entity in the region, and/or calculate a ranking for the region. Calculation rules 42 may include any suitable type of rule. For example, with regard to the risks associated with a situation type of the region, calculation rules 42 may provide that the risk associated with the situation type of the region is an average of the risks associated with each of the factors for that situation type. For example, if each of four factors of a situation type have a risk with a value of 4, calculation rule 42 may provide that the risk associated with the situation type of the region is equal to 4 (e.g., (4+4+4+4)/4=4). As other example, calculation rules 42 may provide that a risk associated with a situation type for a region may be calculated according to any other suitable rule, such as a weighted average, an aggregate, or any other suitable rule. A further example of calculation rules 42 is discussed below.

In the illustrated embodiment, calculation rules 42 may be provided to calculation device 14 by administration device 50. For example, a user (such as an administrator) using the administration device 50 may create each of the calculation rules 42 and may transmit them to calculation device 14 in order to be used to calculate the risk associated with the situation types of the region, the risk associated with an exposure level of an entity in the region, and/or the ranking for the region.

Network 46 represents any network operable to facilitate communication between the components of system 10, such as calculation device 14, administration device 50, user devices 54, and data sources 58. Network 46 may include any interconnecting system capable of transmitting audio, video, signals, data, messages, or any combination of the preceding. Network 46 may include all or a portion of a public switched telephone network (PSTN), a public or private data network, a LAN, a MAN, a WAN, a local, regional, or global communication or computer network, such as the Internet, a wireline or wireless network, an enterprise intranet, or any other communication link, including combinations thereof, operable to facilitate communication between the components.

Administration device 50 represents any components that allow a user of the administration device 50 (such as an administrator) to control calculation device 14 and/or provide information to calculation device 14 (such as provide risk rules 34, selected risks 38, and/or calculation rules 42 to calculation device 14). Administration device 50 may include a personal computer, a workstation, a laptop, a wireless or cellular telephone, an electronic notebook, a personal digital assistant, or any other device (wireless, wireline, or otherwise) capable of receiving, processing, storing, and/or communicating information with other components of system 10 in order to allow a user to control calculation device 14 and/or provide information to calculation device 14. Administration device 50 may comprise a user interface, such as a display, a microphone, keypad, or other appropriate terminal equipment usable by a user.

User device 54 represents any components that may display information received from calculation device 14. User device 54 may include a personal computer, a workstation, a laptop, a wireless or cellular telephone, an electronic notebook, a personal digital assistant, or any other device (wireless, wireline, or otherwise) capable of receiving, processing, storing, and/or communicating information with other components of system 10 in order to display information received from calculation device 14. User device 54 may further allow a user to request information from calculation device 14 and/or provide information to calculation device 14. For example, in order to understand and mitigate current and future threats to an entity in a region, a user may request the ranking for the region, a comparison of the ranking of the region with the ranking of any suitable number of other regions, a comparison of the risk associated with a situation type for a region and the risk associated with the same situation type of any suitable number of other regions, and/or or any other suitable information from calculation device 14. User device 54 may comprise a user interface, such as a display, a microphone, keypad, or other appropriate terminal equipment usable by a user.

User device 54 may display a graphical user interface 56 in order to allow a user to view the information provided by calculation device 14. Graphical user interface 56 may include any graphical interface that allows the user to view information provided by calculation device 14, request information from calculation device 14, and/or provide information to calculation device 14. For example, graphical user interface 56 may allow a user to input one or more pieces of information (such as a selected risk 38) to transmit to calculation device 14. In particular embodiments, graphical user interface 58 may be accessible to a user through a web browser.

Although FIG. 1 illustrates system 10 as only including two user devices 54 (user device 54a and user device 54n), system 10 may include any suitable number of user devices 54. For example, system 10 may include less than two user devices 54 or more than two user devices 54.

Data source 58 may represent any source of information that may be used by calculation device 14. Data source 58 may include a device (such as a database, a personal computer, a workstation, a laptop, a wireless or cellular telephone, an electronic notebook, a personal digital assistant, or any other device capable of receiving, processing, storing, and/or communicating information), a person (such as a person who has knowledge of a region and who provides such knowledge for communication to a calculation device 14), one or more documents (such as a newspaper that includes articles or other information about the region), the Internet (which may include articles and other information about the region), an open source intelligence report, a media outlet (such as a television station or a radio station that broadcasts information that may be communicated to calculation device 14), and/or any other suitable source of information. According to the illustrated embodiment, calculation device 14 may receive information from data sources 58 in order to calculate a risk associated with a factor for a situation type of a region and/or calculate a risk associated with an exposure level of an entity in the region.

Although FIG. 1 illustrates calculation device 14, administration device 50, user devices 54, and data sources 58 as separate components, in particular embodiments, two or more of the calculation device 14, administration device 50, user devices 54, and data sources 58 may be the same component. For example, the calculation device 14, administration device 50, and user devices 54 may be the same device. As such, a user may view the ranking of a region and/or input risk rules 34 at the same device that calculates the ranking of the region. As another example, data sources 58 may be the same device as user devices 54. As such, calculation device 14 may receive information from the same device that displays the ranking of a region.

In an example embodiment of operations, in order to understand and mitigate current and future threats to an entity, a user may transmit a request 100 to calculation device 14. Request 100 may represent a request for any suitable calculation and may include any suitable information to facilitate calculation of data by calculation device 14. For example, request 100 may include a request for the ranking of a particular region, a comparison of the ranking of a particular region with the rankings of any suitable number of other regions, a comparison of a risk associated with a situation type of a particular region and a risk associated with the same situation type for any suitable number of other regions, a comparison of a risk associated with a factor for a situation type for a particular region and a risk associated with a factor for the same situation type for any suitable number of other regions, and/or any other suitable request.

In response to receiving request 100, calculation device 14 may conduct any type of calculation for one or more regions. As an example, calculation device 14 may calculate a ranking that represents an amount of risk to an entity in a region. In order to do so, calculation device 14 may conduct one or more of the following steps.

First, calculation device 14 may determine a region for the calculation. This determination may be based on information included in request 100. For example, calculation device 14 may determine the region based on an identity of a region included in request 100. Therefore, if request 100 requests a ranking for Canada, calculation device 14 may determine the region to be Canada.

Second, calculation device 14 may determine a situation type for the region. According to the example embodiment, situation types for a region may include the following situation types:
  (1) a political situation for the region;
  (2) a legal situation for the region;
  (3) a economic situation for the region;
  (4) a social situation for the region;
  (5) a technological situation for the region; and
  (6) an environmental situation for the region.

Although system 10 has been described as including the six situation types discussed above, any suitable number of situations types and any other suitable types of situation types may be included in system 10 of FIG. 1. For example, the situation types for a region may include any other macro-environmental situation type for the region, any other technical situation type for the region, or any other situation type that may need to be taken into consideration for developing business or sustaining business of an entity. According to the example embodiment, calculation device 14 may determine a situation type for the region by selecting one of the situation types. For example, calculation device 14 may select a political situation for the region as the situation type.

Third, calculation device 14 may determine whether a risk associated with a factor of the situation type has been received. As is discussed above, each situation type may include a plurality of factors that may be used to determine the risk associated with the situation type for the region. According to the example embodiment, the situation types discussed above (e.g., a political situation, a legal situation, an economic situation, a social situation, a technological situation, and an environmental situation) may include the following factors:
  (1) Political Situation
    (a) Corruption
    (b) Terrorism
    (c) Organized Crime
    (d) Weaponry
    (e) Geo-Political Conflict
  (2) Legal Situation
    (a) Judicial Independence
    (b) Audit & Reporting Standard
    (c) Legal Framework
    (d) Intellectual Property Protection
    (e) Transparency in Government policymaking
  (3) Economic Situation
    (a) Asset Price Collapse
    (b) Price Volatility
    (c) Quality of Infrastructure
    (d) Business Sophistication
    (e) Liquidity/Credit Crunch
  (4) Social Situation
    (a) Demographic Challenges
    (b) Economic Disparity
    (c) Food/Water Security
    (d) Migration
    (e) Business Impact of Chronic Diseases
  (5) Technological Situation
    (a) Information Infrastructure
    (b) Online Data and Information Security
    (c) Threats from New Technology
    (d) Availability of Latest Technology
    (e) Firm Level Technology Absorption
  (6) Environmental Situation
    (a) Avalanches/Drought/Heat Wave/Earthquakes
    (b) Tornadoes/Hurricanes
    (c) Snow/Ice Storms
    (d) Volcanic Eruptions/Tsunamis
    (e) Forest Fire/Landslide/Flood Calculation device 14 may select one of the factors for one of the situation types and determine whether a risk associated with that factor has been received. For example, if calculation device 14 selects the corruption factor for the political situation of Canada, calculation device 14 may determine whether the risk associated with the corruption factor for the political situation of Canada has been received.

Calculation device 14 may receive a selection of a risk associated with a factor of the situation type in a selection message 104. Selection message 104 may represent a selection of a risk for any factor for any situation type for any region. For example, selection message 104 may represent a selection of "low risk" for the corruption factor for the political situation of Canada. According to the example embodiment, once the selection has been received by calculation device 14, the selection may be stored in memory 26 as the selected risk 38 for that factor.

Based on the selected risk 38 received from selection message 104, calculation device 14 may associate the selected risk 38 with that factor for that situation type for that region. For example, calculation device 14 may associate the "low risk" selection with the corruption factor for the political situation of Canada. According to the example embodiment, selection message 104 is received by calculation device 14 from user device 54a. In such an embodiment, a user of user device 54a may have determined (based on their own knowledge and/or an analysis of any suitable amount of documents and/or information) that the selection included in selection message 104 is the risk that should be associated with the factor for the situation type of that region.

Although FIG. 1 illustrates selection message 104 as having been received from user device 54a, in particular embodiments, selection message 104 may have been received from any of the user devices 54, any of the data sources 58, administrative device 50, and/or from an input directly into calculation device 14 (such as by a keyboard of calculation device 14).

According to the example embodiment, if a risk associated with a factor of a situation type for a region has not been received, calculation device 14 may calculate the risk associated with the factor. As an example, calculation device 14 may receive information from a data source, such as information 108 received from data source 58a. Information 108 may include any suitable information that may be used by calculation device 14 in order to calculate the risk associated with a factor of the situation type for a region. For example, information 108 may include one or more reports from experts on the region, one or more articles regarding the region, one or more television and/or radio reports regarding the region, and/or any other type of information regarding the region. Based on information 108, and further based on one or more risk rules 34, calculation device 14 may calculate the risk associated with a factor of the situation type for the region.

Risk rules 34 may include any suitable rule for calculating risks associated with the factors for the situation type of the region. For example, the risk rules 34 may provide that the corruption factor is a "low risk" when the information received from data source 58 indicates that the region has only had a predetermined number of corruption cases within a certain time period (such as four corruption cases within the last ten years). Therefore, based on information 108, and such risk rules 34, calculation device 14 may calculate that there is a "low risk" for the corruption factor for the political situation for Canada.

Although the example embodiment has described risk rules 34 as including a particular rule for calculating a risk associated with a factor of a situation type for a region, any other suitable rule may be used to calculate such a risk. For example, risk rules 34 may include any other type of rules and/or measurements for calculating a risk.

Fourth, calculation device 14 may determine whether there are any other factors of the situation type for the region. For example, if a risk has been determined (using the selected risk 38 and/or the calculation of the risk discussed above) for only the corruption factor for the political situation of a region, calculation device 14 may determine that a risk needs to be determined for the rest of the factors for the political situation. If it is determined that there are other factors of the situation type for the region, the third step (discussed above) may be repeated for each of the factors. However, if there are no other factors for the situation type, calculation device 14 may move to the fifth step.

Fifth, calculation device 14 may calculate the risk associated with the situation type for the region. According to the example embodiment, the risk associated with the situation type for the region may be calculated based on one or more of the risks associated with the factors of the situation type and one or more of the calculation rules 42. For example, in order to calculate the risk associated with the political situation for Canada, calculation device 14 may calculate the risk based on the risk associated with the corruption factor, the terrorism factor, the organized crime factor, the weaponry factor, and the geo-political conflict factor for Canada, and further based on one or more of the calculation rules 42.

Calculation rules 42 may include any suitable rules for calculating the risk of the situation type of the region. For example, according to the example embodiment, calculation rules 42 may include a rule for calculating the risk of the situation type of the region based on an average of the risks associated with the factors for the situation type. For example, according to the example embodiment, each of the risks associated with the factors for a situation type may be equivalent to a value. In particular, "low risk" may be equal to the value 1, "medium risk" may be equal to the value 2, "medium-high risk" may be equal to the value 3, and "high risk" may be equal to the value 4. Based on these values, calculation device 14 may use calculation rules 42 to determine that the risk for the situation type is the average of each of these values. For example, for the political situation of Canada, if the risk for the corruption factor is "low risk," the risk for the terrorism factor is "low risk," the risk for the organized crime factor is "medium risk," the risk for the weaponry factor is "low risk," and the risk for the geo-political conflict factor is "low risk," the risk for the political situation of Canada may be calculated to be 1.2 (e.g., (1+1+2+1+1)/6=1.2).

Although the example embodiment has described calculation rules 42 as including a particular rule for calculating a risk associated with a situation type for a region, any other suitable rule may be used to calculate such a risk. For example, risk calculation rules 42 may include any other type of rules and/or measurements for calculating a risk, such as a weighted average.

Sixth, calculation device 14 may determine whether there are any other situation types for the region. For example, if a risk has been calculated for only the political situation of a region, calculation device 14 may determine that a risk needs to be determined for the remaining situation types for that region. If it is determined that there are other situation types for the region, steps 2-6 (discussed above) may be repeated for each of the situation types. However, if there are no other situation types, calculation device 14 may move to the seventh step.

Seventh, calculation device 14 may calculate a risk associated with an exposure level of an entity in the region. An exposure level of an entity in the region may refer to how critical the region is to the current organization and/or makeup of the entity. Furthermore, it may also ascertain the institutional risk exposure from an existing infrastructure standpoint of the entity. In order to calculate this risk, calculation device 14 may determine the entity that the risk is calculated for. According to the example embodiment, the identity of the entity may be indicated in request 100. For example, request 100 may request the ranking for a particular entity in a particular region. Based on this indication, calculation device 14 may determine to calculate the risk associated with the exposure level of that particular entity in the region.

According to the example embodiment, calculation device 14 may follow steps similar to steps 3-5, (discussed above), in order to calculate the risk associated with an exposure level of an entity in the region. For example, similar to step 3, calculation device 14 may determine whether a risk associated with a factor of the exposure of the entity has been received. A factor of the exposure level of the entity may refer to any factor that may be used to determine the risk associated the exposure level of the entity in the region. According to the example embodiment, the factors for the exposure level of the entity may include:

(1) Criticality (e.g., how critical the businesses of the entity in the region are);
(2) Data Center/Critical location (e.g., is there a data center (such as one or more servers, one or more critical applications of the entity, and/or one or more information storage areas of the entity) in the region);
(3) Associate Population (e.g., number of employees);
(4) Number of lines of business (e.g., number of lines of business of the entity in the region); and
(5) Regulatory/Customer Notification (e.g., the laws affecting the business of the entity).

Similar to step 3, calculation device 14 may determine that the risk associated with a factor of the exposure level of the entity has been received if a selection of that risk has been received, such as in selection message 104. If it is determined that a selection has been received (and stored as a selected risk 38), the selection may be used as the risk associated with the factor of the exposure level of the business of the entity. On the other hand, if a selection has not been received, similar to step 3, calculation device 14 may receive information 108 from a data source 58 regarding the entity. In addition to receiving information 108 from a data source 58, information 108 may further be received directly from the entity, itself, or from internal files stored by the entity. After information 108 is received, and also similar to step 3, calculation device 14 may calculate the risk associated with the factor based on one or more risk rules 34.

Once a risk has been determined for each of the factors of the exposure level of the entity in the region, calculation device 14 may calculate the risk associated with the exposure level of the entity in the region. According to the example embodiment, such a calculation may be similar to the calculation in step 5, discussed above. For example, the calculation of the risk associated with the exposure level of the entity may be based on the risk associated with each of the factors of the exposure level, and further based on one or more calculation rules 42. In particular, if the risk associated with the business criticality factor is "high risk," the risk associated with the data center/critical location factor is "medium risk," the risk associated with associate population factor is "high risk," the risk associated with the number of lines of business factor is "high risk," the risk associated with the regulatory/customer notification factor is "low risk," and the calculation rules 42 provide that the risk associated with the exposure level of the entity in the region may be calculated as the average of each of these risks, the risk associated with the exposure level of the entity in the region may be 3 (e.g., (4+2+4+4+1)/6=3).

Although the example embodiment is described above as using a calculation rule 42 that calculates the risk of exposure level of the entity based on a particular rule, in particular embodiments, any other suitable calculation rules 42 may be used. For example, calculation rules 42 may include any other type of rules and/or measurements for calculating a risk, such as a weighted average.

Eighth, the calculation device 14 calculates the ranking for the region. The ranking for the region may refer to the ranking of a risk to an entity in the region. For example, if the region has a high ranking, there may be a high risk to the entity in the region. On the other hand, if the region has a low ranking, there may be a low risk to the entity in the region.

According to the example embodiment, the ranking of the region may be based on one or more of the calculated risks associated with the situation types of the region, and may be further based on the calculated risk associated with the exposure level of the entity in the region. For example, the ranking for a region, such as Canada, may be based on the calculated risks associated with the political situation, the legal situation, the economic situation, the social situation, the technological situation, and the environmental situation for Canada, and may be further based on the calculated risk associated with the exposure level of the entity in Canada. Furthermore, the ranking of the region may be calculated according to one or more of the calculation rules 42. Calculation rules 42 may include any suitable rule for calculating the ranking of the region. As an example, the ranking of the region may be calculated according to Sharpe's Ratio:

$$S(X)=(r_x-R_f)/\text{StdDev}(x)$$

where S(X) equals the ranking of the region
where $r_x$ equals an aggregate of all the risks associated with the situation types for the region
where $R_f$ equals the risk associated with the exposure level of the entity
where StdDev(x) equals the standard deviation of the aggregate of all the risks associated with the situations types for all of the regions (e.g., if rankings have been calculated for three regions, StdDev(x) is equal to the standard deviation of the aggregate of all the risks associated with the situations types for each of the three regions)

Although the example embodiment is described above as using a calculation rule 42 that provides for a calculation of a ranking of a region based on a particular equation, in particular embodiments, any other suitable calculation rules 42 may be used. For example, calculation rules 42 may include any other type of equations, rules, and/or measurements for calculating the ranking of a region.

Ninth, calculation device 14 determines whether there are any other regions to calculate a ranking for. For example, it may be determined that there are other regions to calculate a ranking for when request 100 includes a request for multiple regions (such as a request for the rankings for Canada and the United States). As another example, even if request 100 did not include a request for the rankings of multiple regions, calculation device 14 may determine that there are other regions to calculate a ranking for if there are any other regions in the city, state, country, continent, or any other suitable geographic area. If it is determined that a ranking needs to be calculated for other regions, steps 1-9 may be repeated for each of the regions. On the other hand, if it is determined that there are no other regions to calculate a ranking for, calculation device 14 may move to step 10.

Tenth, calculation device 14 may communicate one or more results 112 for display. Results 112 may include any suitable information to be displayed in any suitable format. For example, if request 100 included a request for the ranking for a particular region, results 112 may include the ranking for the particular region. As another example, if request 100 included a request for a comparison of a ranking of a particular region with the rankings of any suitable number of other regions (and/or a comparison of the risk associated with a situation type for a particular region and the risks associated with the same situation type of any suitable number of other regions), results 112 may include such information for display. In particular embodiments, results 112 may display the information as a heat map and/or any other graphical representation. Furthermore, based on results 112, user device 54 may display results 112 on graphical user interface 56. As such, a user of user device 54 may be able to understand and mitigate current and future threats to an entity.

Although FIG. 1 has been described above as calculating risks and rankings with regard to a single entity, in particular embodiments, system 10 may be used to calculate risks and rankings with regard to multiple entities. As such, a user may be able to understand and mitigate current and future threats to multiple entities and may be able to compare the current and future threats of the multiple entities.

Modifications, additions, or omissions may be made to system 10 without departing from the scope of the invention. For example, the calculations performed by calculation device 14 may be performed without receiving a request from a user. As such, if a user does later request a ranking, the ranking may have already been calculated, and may be communicated without any further calculations. Additionally, system 10 may include any number of calculation devices 14, networks 46, administration devices 50, user devices 54, and/or data sources 58. Any suitable logic may perform the functions of system 10 and the components within system 10.

Figure 2A:
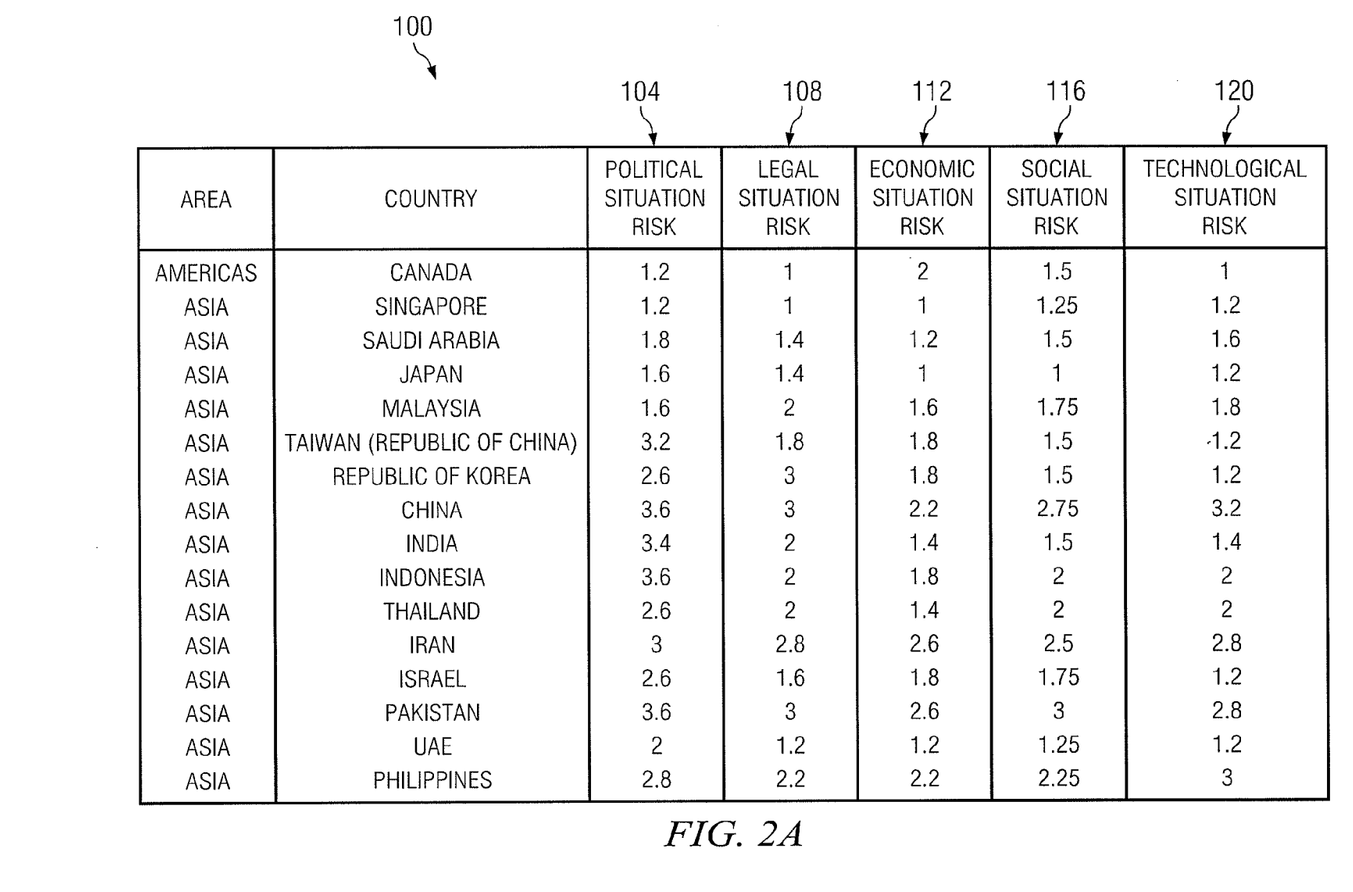
FIGS. 2A-2C illustrate an example display according to one embodiment of the present disclosure.
Figure 2B:
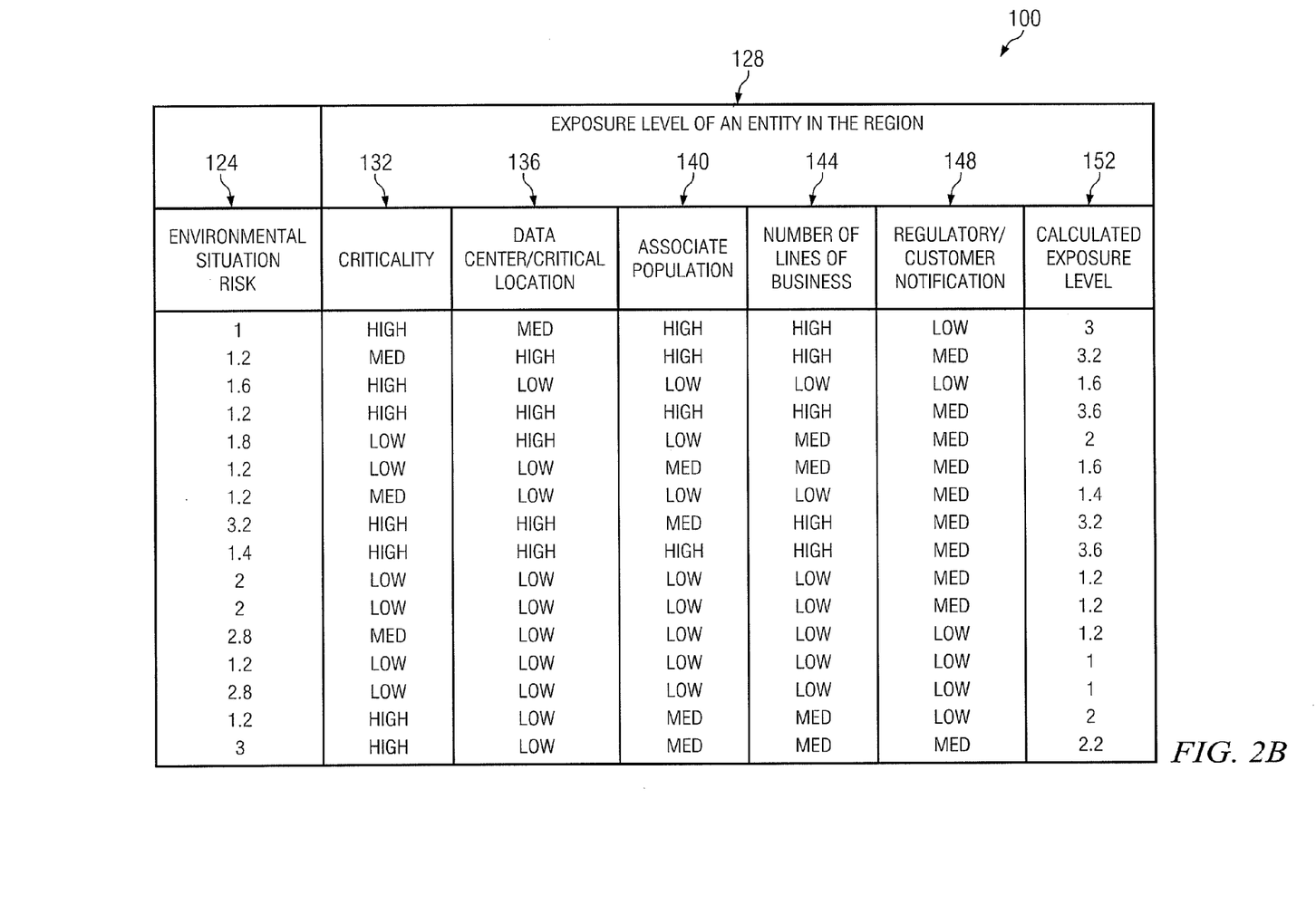
Figure 2C:
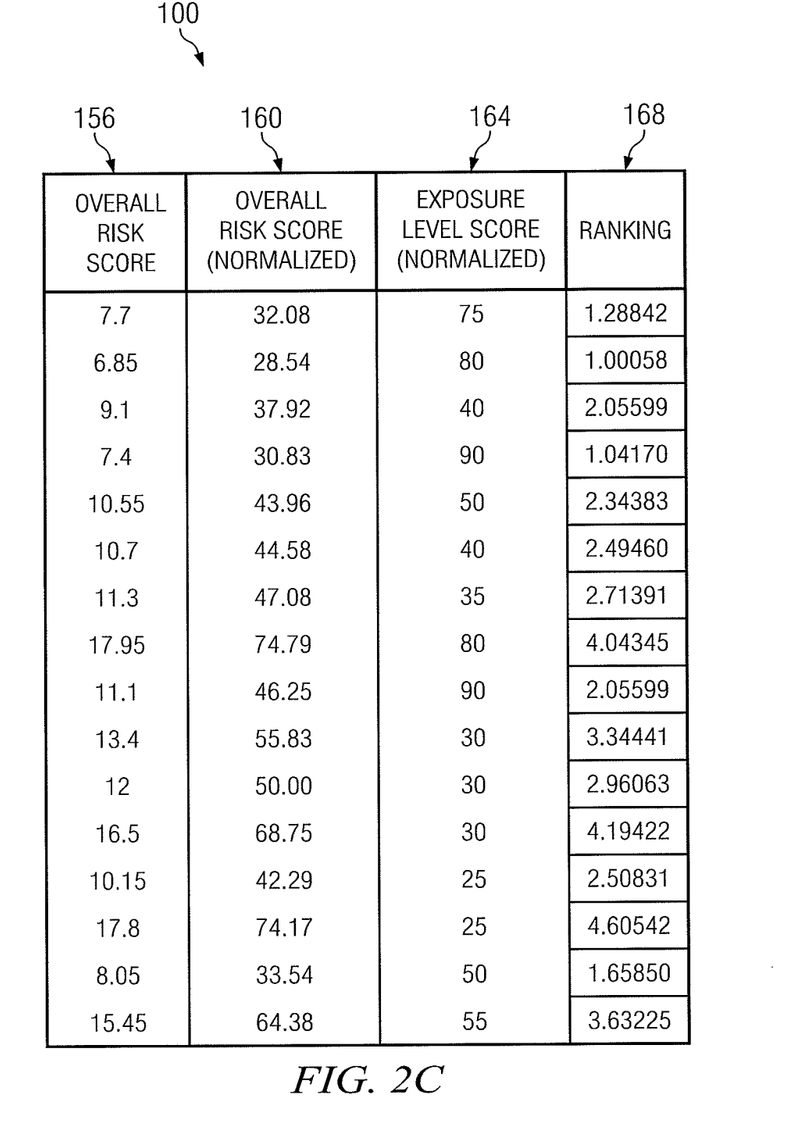

FIGS. 2A-2C illustrate an example display 100 according to one embodiment of the present disclosure. Display 100 includes one or more of the calculations conducted by calculation device 14 of FIG. 1. Display 100 may be displayed to a user using a user device, such as user device 54a of FIG. 1. In particular embodiments, display 100 may be displayed to a user in response to the user providing a request for the information included in display 100.

Display 100 includes information regarding the risks to an entity in a plurality of countries. In the illustrated embodiment, display 100 includes a political situation risk column 104, a legal situation risk column 108, an economic situation risk column 112, a social situation risk column 116, a technological situation risk column 120, and an environmental situation risk column 124. Each of these columns 104-124 includes calculated risks for a plurality of countries. For example, the country Canada includes the following calculated risks: a political situation risk of 1.2, a legal situation risk of 1, an economic situation risk of 2, a social situation risk of 1.5, a technological situation risk of 1, and an environmental situation risk of 1. The risks displayed in columns 104-124 may be calculated according to the embodiment discussed in FIG. 1.

Display 100 further includes an exposure level column 128. According to the illustrated embodiment, the exposure level column 128 includes the following additional columns: a criticality factor column 132, a data center/critical location factor column 136, an associate population factor column 140, a number of lines of business factor column 144, and a regulatory/customer notification factor column 148. The factor columns 132-148 include the risks associated with the factors for the exposure level for the plurality of countries. For example, with regard to the country Canada, display 100 includes the following risks associated with the factors for the exposure level: a high risk for the criticality factor for an exposure level, a medium risk for the data center/critical location factor for the exposure level, a high risk for the associate population factor for the exposure level, a high risk for the number of lines of business factor for the exposure level, and a low risk for the regulatory/customer notification factor for the exposure level. As is discussed in FIG. 1, each of these risks associated with the factors for the exposure level may be determined based on selected risks 38 and/or calculations conducted using information received from data sources 58 and risk rules 34.

Exposure level column 128 further includes calculated exposure level column 152. Calculated exposure level column 152 includes the calculated risks for the exposure level of an entity in the plurality of countries. The calculated risks associated with the exposure level of the entity in the countries may be calculated as discussed in FIG. 1. For example, the risk associated with the exposure level of an entity in Canada may be calculated to be 3 (e.g., (4+2+4+4+1)/6=3).

Display 100 further includes an overall risk score column 156, an overall risk score (normalized) column 160, an exposure level score (normalized) column 164, and a ranking column 168. Overall risk score column 156 may include the overall risk scores for the plurality of countries. According to the illustrated embodiment, the overall risk score for a country may be an aggregate of the risks associated with each of the political situation, legal situation, economic situation, social situation, technological situation, and environmental situation. For example, Canada may have an overall risk score of 7.7 (e.g., 1.2+1+2+1.5+1+1=7.7).

Overall risk score (normalized) column 160 includes normalized versions of the overall risk scores for the plurality of countries. For example, the overall risk score for Canada may be normalized on a scale of 100 to be 32.08. The overall risk scores may be normalized in any suitable manner and to any suitable scale.

Exposure level score (normalized) column 164 includes normalized versions of the calculated exposure level risks for the plurality of countries. For example, the calculated exposure level risk of 3 for Canada may be normalized on a scale of 100 to be 75. The calculated exposure level risk may be normalized in any suitable manner and to any suitable scale.

Ranking column 168 may include rankings that represents an amount of risk to an entity in the plurality of countries. According to the illustrated embodiment, the ranking for a country may be calculated according to the embodiment illustrated in FIG. 1. For example, a ranking for a country may be calculated according to the Sharpe's Ratio. In particular, the ranking for Canada may be calculated as 1.28842.

Although display 100 has been described above as only including particular information, any other suitable information may be included in display 100. For example, in particular embodiments, the risks associated with each of the factors of each of the situation types may be illustrated in display 100. Furthermore, any suitable number of countries may be displayed in display 100. Additionally, instead of countries, any other suitable region may be displayed in display 100.

Figure 3:
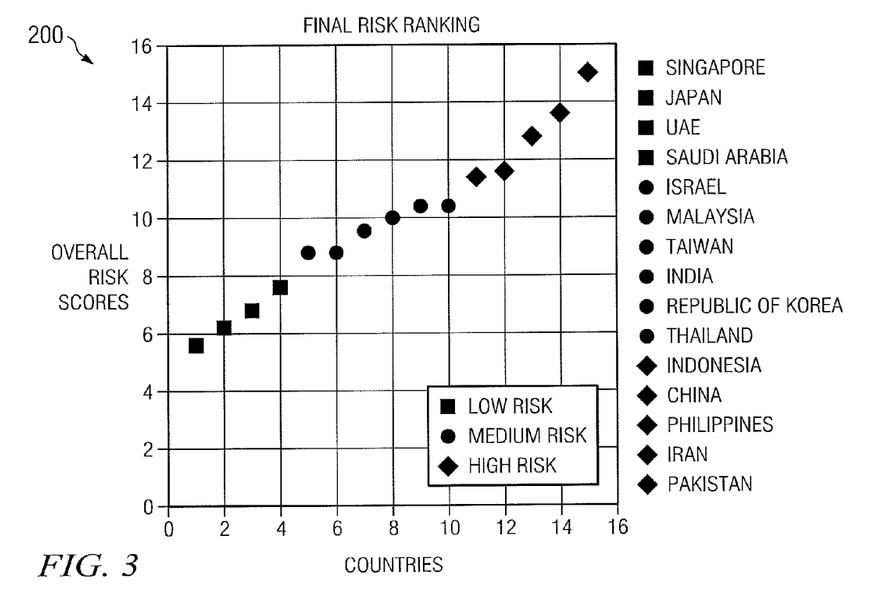
FIG. 3 illustrates an example display according to one embodiment of the present disclosure.

FIG. 3 illustrates an example display 200 according to one embodiment of the present disclosure. According to the illustrated embodiment, display 200 includes a heat map that displays a comparison of the overall risk scores for a plurality of regions. In particular embodiments, display 200 may allow a user to compare and contrast the overall risk scores for a plurality of regions.

Figure 4:
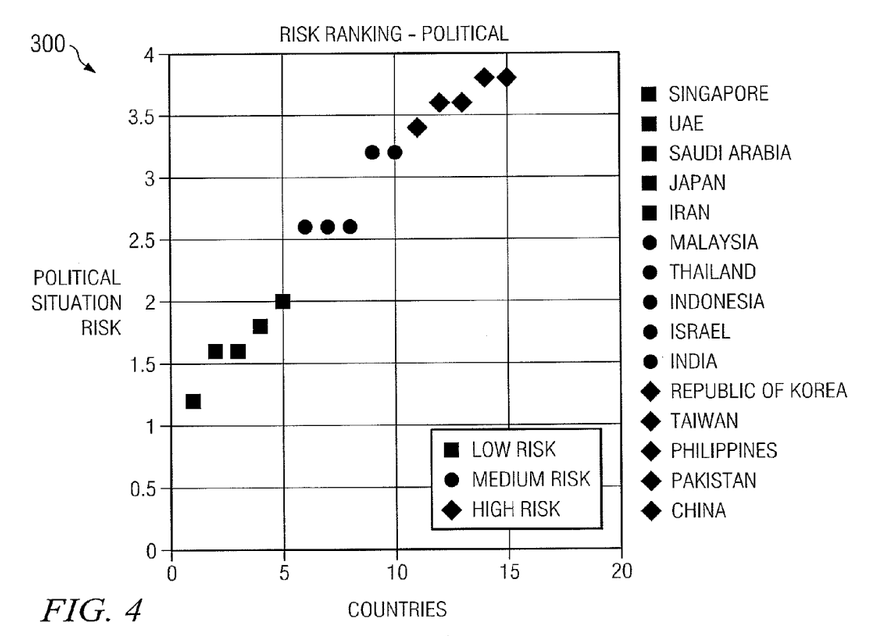
FIG. 4 illustrates an example display according to one embodiment of the present disclosure.

FIG. 4 illustrates a display 300 according to one embodiment of the present disclosure. According to the illustrated embodiment, display 300 includes a heat map that displays a comparison of the risks associated with a political situation for a plurality of regions. In particular embodiments, display 300 may allow a user to compare and contrast the political situation risks for a plurality of regions.

Although display 300 of FIG. 4 illustrates a comparison of the risks associated with the political situation for a plurality of regions, display 300 may include a comparison of any other suitable risks for the plurality of regions. For example, display 300 may include a comparison of the risks associated with one or more of the following situation types: a political situation of a plurality of regions, a legal situation of a plurality of regions, an economic situation of a plurality of regions, a social situation of a plurality of regions, a technological situation of a plurality of regions, an environmental situation of a plurality of regions, and/or an exposure level of an entity in a plurality of regions.

Figure 5:
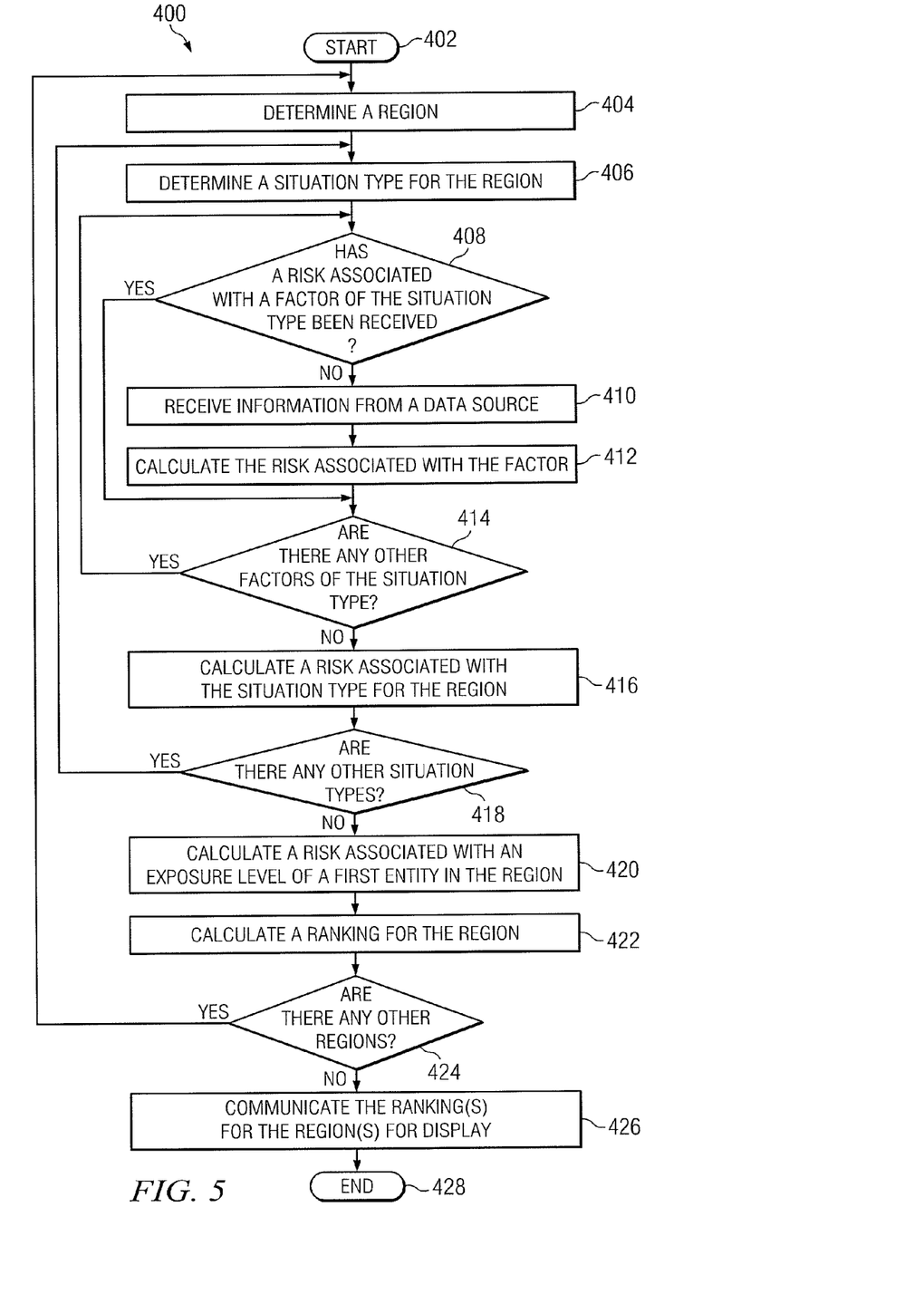
FIG. 5 illustrates a method for calculating the risk to an entity in one or more regions according to one embodiment of the present disclosure.

FIG. 5 illustrates a method 400 for calculating the risk to an entity in one or more regions according to one embodiment of the present disclosure. In particular embodiments, one or more steps of method 400 may be performed by calculation device 14 of FIG. 1.

The method begins at step 402. At step 404, a region is determined. According to the example embodiment, the determination may be based on information included in a request received by calculation device 14.

At step 406, a situation type for the region is determined. According to the example embodiment, a situation type for the region may be determined by selecting a situation type from the following: a political situation for the region, a legal situation for the region, an economic situation for the region, a social situation for the region, a technological situation for the region, and an environmental situation for the region.

At step 408, it may be determined whether a risk associated with a factor of the situation type has been received. If a risk associated with a factor of the situation type has been received, the method may move to step 414. On the other hand, if a risk associated with a factor of the situation type has not been received, the method may move to step 410, where information is received from a data source. According to the example embodiment, the information received from the data source may include any suitable information that may be used in order to calculate the risk associated with a factor of the situation type for a region. For example, the information may include one or more reports from experts on the region, one or more articles regarding the region, one or more television and/or radio reports regarding the region, and/or any other type of information regarding the region.

At step 412, the risk associated with the factor is calculated. According to the example embodiment, the risk associated with the factor may be calculated according to one or more risk rules 34.

At step 414, it is determined whether there are any other factors of the situation type for the region. If it is determined that there are other factors of the situation type for the region, steps 408-414 may be repeated for each of the factors. However, if there are no other factors for the situation type, the method moves to step 416.

At step 416, a risk associated with the situation type for the region is calculated. According to the example embodiment, the risk associated with the situation type for the region may be calculated based on one or more of the risks associated with the factors of the situation type and one or more of the calculation rules 42.

Once the risk associated with the situation type for the region has been calculated, the method moves to step 418 where it is determined whether there are any other situation types for the region. If it is determined that there are other situation types for the region, steps 406-418 may be repeated for each of the situation types. However, if there are no other situation types, the method moves to step 420.

At step 420, a risk associated with an exposure level of an entity in the region is calculated. In order to calculate the exposure level of an entity in the region, the method may perform one or more steps similar to steps 406-416. For example, the method may include determining an entity that the risk is calculated for. Furthermore, for each of a plurality of factors of the exposure level of the entity in the region, the method may further include determining whether a risk associated with the factor has been received, receiving information from a data source, and/or calculating the risk associated with the factor. Once a risk has been determined for each of the factors of the exposure level of the entity in the region, the risk associated with the exposure level of the entity in the region may be calculated according to each of factors of the exposure level and one or more calculation rules 42.

After the risk associated with an exposure level of the entity in the region is calculated, the method moves to step 422, where a ranking for the region is calculated. A ranking for the region may refer to the ranking of a risk to an entity in the region. According to the example embodiment, the ranking of the region may be based on one or more of the calculated risks associated with the situation types of the region, and may be further based on the calculated risk associated with the exposure level of the entity in the region. Furthermore, the ranking of the region may be calculated according to one or more of the calculation rules 42. As an example, the ranking of the region may be calculated according to Sharpe's Ratio.

After a ranking for the region is determined, the method moves to step 424 where it is determined whether there are any other regions to calculate a ranking for. If it is determined that a ranking is to be calculated for other regions, steps 404-424 may be repeated for each region. On the other hand, if it is determined that there are no other regions to calculate a ranking for, the method moves to step 426.

At step 426, the ranking(s) for the region(s) is communicated for display. The ranking(s) may include any suitable information to be displayed in any suitable format. For example, the ranking(s) may include the ranking for the particular region. As another example, the ranking(s) may include a comparison of a ranking of a particular region with the rankings of any suitable number of other regions (and/or a comparison of the risk associated with a situation type for a particular region and the risk associated with the same situation type of any suitable number of other regions). In particular embodiments, once the ranking(s) for the region(s) is communicated for display, the ranking(s) may be viewed in any suitable manner. For example, a user may view the ranking(s) on a user device, such as user device 54a of FIG. 1. In particular embodiments, viewing the ranking(s) may include accessing the ranking(s) through a network. For example, the user may access the ranking(s) through an online portal, using, for example, SpotFire®.

Once the ranking(s) for the region(s) is communicated for display, the method moves to step 428. At step 428, the method ends.

Modifications, additions, or omissions may be made to method 400. For example, although method 400 illustrates calculation device 14 calculating a risk to an entity in one or more regions, in particular embodiments, the calculations may be performed by any other suitable device. Additionally, steps in FIG. 5 may be performed in parallel or in any suitable order.

Certain embodiments of the disclosure may provide one or more technical advantages. For example, a ranking that represents an amount of risk to the entity in the region may be calculated based on a risk associated with an exposure level of the entity in the region. Therefore, the ranking for the region may be based on the entity's existing infrastructure in the region. Furthermore, the calculation of the ranking for the first region may also be based on one or more specifics of the entity, itself. As another example, the calculation of the ranking that represents an amount of risk to the entity in the region may further be based on risks associated with each of a political situation of the region, a legal situation of the region, an economic situation of the region, a social situation of the region, a technological situation of the region, and an environmental situation of the region. As such, the ranking may be based on more than one situation type of the region, providing a more balanced analysis of the region. As a further example, based on the calculated risks for a plurality of regions, a comparison of the rankings of each of the regions (or a comparison of one or more calculated risks of each of the plurality of regions) may be determined and communicated for display to a user. As such, the user may be able to view and analyze a comparative analysis of the rankings of each of the regions and/or of the calculated risks of each of the regions (such as a comparative analysis of the risk associated with a political situation or an economic situation for each of the plurality of regions).

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system, comprising:
a memory operable to store a plurality of risk rules and a plurality of calculation rules; and
a processor communicatively coupled to the memory and operable to:
for a first region:
calculate a risk associated with a political situation of the first region according to one or more of the plurality of calculation rules;
calculate a risk associated with a legal situation of the first region according to the one or more of the plurality of calculation rules;
calculate a risk associated with an economic situation of the first region according to the one or more of the plurality of calculation rules;
calculate a risk associated with a social situation of the first region according to the one or more of the plurality of calculation rules;
calculate a risk associated with a technological situation of the first region according to the one or more of the plurality of calculation rules;
calculate a risk associated with an environmental situation of the first region according to the one or more of the plurality of calculation rules; and
for a first entity, calculate a risk associated with an exposure level of the first entity in the first region according to the one or more of the plurality of calculation rules;
based at least on the calculated risks associated with the political situation, the legal situation, the economic situation, the social situation, the technological situation, and the environmental situation of the first region, and further based at least on the calculated risk associated with the exposure level of the first entity in the first region, calculate a ranking for the first region according to a second one or more of the plurality of calculation rules, the ranking representing an amount of risk to the first entity in the first region; and
an interface communicatively coupled to the processor and operable to communicate the ranking for the first region for display;
wherein the processor is further operable to:
for a second region:
calculate a risk associated with a political situation of the second region according to the one or more of the plurality of calculation rules;
calculate a risk associated with a legal situation of the second region according to the one or more of the plurality of calculation rules;
calculate a risk associated with an economic situation of the second region according to the one or more of the plurality of calculation rules;
calculate a risk associated with a social situation of the second region according to the one or more of the plurality of calculation rules;
calculate a risk associated with a technological situation of the second region according to the one or more of the plurality of calculation rules; and
calculate a risk associated with an environmental situation of the second region according to the one or more of the plurality of calculation rules;
for the first entity, calculate a risk associated with an exposure level of the first entity in the second region according to the one or more of the plurality of calculation rules;
based at least on the calculated risks associated with the political situation, the legal situation, the economic situation, the social situation, the technological situation, and the environmental situation of the second region, and further based at least on the calculated risk associated with the exposure level of the first entity in the second region, calculate a ranking for the second region according to the second one or more of the plurality of calculation rules, the ranking representing an amount of risk to the first entity in the second region; and
wherein the interface is further operable to communicate a comparison of the ranking for the first region and the ranking for the second region for display.

2. The system of claim 1, wherein the processor is further operable to:
receive information from one or more data sources;
for a factor of a plurality of factors for the political situation of the first region, calculate a risk associated with the factor for the political situation of the first region based on the received information and one or more of the plurality of risk rules, wherein the risk associated with the political situation of the first region is calculated based on risks associated with the plurality of factors for the political situation of the first region;
for a factor of a plurality of factors for the legal situation of the first region, calculate a risk associated with the factor for the legal situation of the first region based on the received information and the one or more of the plurality of risk rules, wherein the risk associated with the legal situation of the first region is calculated based on risks associated with the plurality of factors for the legal situation of the first region;
for a factor of a plurality of factors for the economic situation of the first region, calculate a risk associated with the factor for the economic situation of the first region based on the received information and the one or more of the plurality of risk rules, wherein the risk associated with the economic situation of the first region is calculated based on risks associated with the plurality of factors for the economic situation of the first region;
for a factor of a plurality of factors for the social situation of the first region, calculate a risk associated with the factor for the social situation of the first region based on the received information and the one or more of the plurality of risk rules, wherein the risk associated with the social situation of the first region is calculated based on risks associated with the plurality of factors for the social situation of the first region;

for a factor of a plurality of factors for the technological situation of the first region, calculate a risk associated with the factor for the technological situation of the first region based on the received information and the one or more of the plurality of risk rules, wherein the risk associated with the technological situation of the first region is calculated based on risks associated with the plurality of factors for the technological situation of the first region; and for a factor of a plurality of factors for the environmental situation of the first region, calculate a risk associated with the factor for the environmental situation of the first region based on the received information and the one or more of the plurality of risk rules, wherein the risk associated with the environmental situation of the first region is calculated based on risks associated with the plurality of factors for the environmental situation of the first region.

3. The system of claim 1, wherein the processor is further operable to receive:

for a factor of a plurality of factors for the political situation of the first region, a selection of a risk associated with the factor for the political situation of the first region, wherein the risk associated with the political situation of the first region is calculated based on risks associated with the plurality of factors for the political situation of the first region;

for a factor of a plurality of factors for the legal situation of the first region, a selection of a risk associated with the factor for the legal situation of the first region, wherein the risk associated with the legal situation of the first region is calculated based on risks associated with the plurality of factors for the legal situation of the first region;

for a factor of a plurality of factors for the economic situation of the first region, a selection of a risk associated with the factor for the economic situation of the first region, wherein the risk associated with the economic situation of the first region is calculated based on risks associated with the plurality of factors for the economic situation of the first region;

for a factor of a plurality of factors for the social situation of the first region, a selection of a risk associated with the factor for the social situation of the first region, wherein the risk associated with the social situation of the first region is calculated based on risks associated with the plurality of factors for the social situation of the first region;

for a factor of a plurality of factors for the technological situation of the first region, a selection of a risk associated with the factor for the technological situation of the first region, wherein the risk associated with the technological situation of the first region is calculated based on risks associated with the plurality of factors for the technological situation of the first region; and for a factor of a plurality of factors for the environmental situation of the first region, a selection of a risk associated with the factor for the environmental situation of the first region, wherein the risk associated with the environmental situation of the first region is calculated based on risks associated with the plurality of factors for the environmental situation of the first region.

4. The system of claim 1, wherein the interface is further operable to:

communicate a comparison of the risk associated with the political situation of the first region and the risk associated with the political situation of the second region for display;

communicate a comparison of the risk associated with the legal situation of the first region and the risk associated with the legal situation of the second region for display;

communicate a comparison of the risk associated with the economic situation of the first region and the risk associated with the economic situation of the second region for display;

communicate a comparison of the risk associated with the social situation of the first region and the risk associated with the social situation of the second region for display;

communicate a comparison of the risk associated with the technological situation of the first region and the risk associated with the technological situation of the second region for display; and communicate a comparison of the risk associated with the environmental situation of the first region and the risk associated with the environmental situation of the second region for display.

5. The system of claim 1, further comprising a display communicatively coupled to the interface and operable to display the comparison of the ranking for the first region and the ranking for the second region.

6. The system of claim 5, wherein the comparison of the ranking for the first region and the ranking for the second region comprises a heat map.

7. A non-transitory computer readable medium comprising logic, the logic, when executed by a processor, operable to:

for a first region:
calculate a risk associated with a political situation of the first region according to one or more of a plurality of calculation rules;
calculate a risk associated with a legal situation of the first region according to the one or more of the plurality of calculation rules;
calculate a risk associated with an economic situation of the first region according to the one or more of the plurality of calculation rules;
calculate a risk associated with a social situation of the first region according to the one or more of the plurality of calculation rules;
calculate a risk associated with a technological situation of the first region according to the one or more of the plurality of calculation rules;
calculate a risk associated with an environmental situation of the first region according to the one or more of the plurality of calculation rules; and for a first entity, calculate a risk associated with an exposure level of the first entity in the first region according to the one or more of the plurality of calculation rules;

based at least on the calculated risks associated with the political situation, the legal situation, the economic situation, the social situation, the technological situation, and the environmental situation of the first region, and further based at least on the calculated risk associated with the exposure level of the first entity in the first region, calculate a ranking for the first region according to a second one or more of the plurality of calculation rules, the ranking representing an amount of risk to the first entity in the first region; and communicate the ranking for the first region for display;

for a second region:

calculate a risk associated with a political situation of the second region according to the one or more of the plurality of calculation rules;
calculate a risk associated with a legal situation of the second region according to the one or more of the plurality of calculation rules;
calculate a risk associated with an economic situation of the second region according to the one or more of the plurality of calculation rules;
calculate a risk associated with a social situation of the second region according to the one or more of the plurality of calculation rules;
calculate a risk associated with a technological situation of the second region according to the one or more of the plurality of calculation rules; and
calculate a risk associated with an environmental situation of the second region according to the one or more of the plurality of calculation rules;
for the first entity, calculate a risk associated with an exposure level of the first entity in the second region according to the one or more of the plurality of calculation rules;
based at least on the calculated risks associated with the political situation, the legal situation, the economic situation, the social situation, the technological situation, and the environmental situation of the second region, and further based at least on the calculated risk associated with the exposure level of the first entity in the second region, calculate a ranking for the second region according to the second one or more of the plurality of calculation rules, the ranking representing an amount of risk to the first entity in the second region; and
communicate a comparison of the ranking for the first region and the ranking for the second region for display.

8. The computer readable medium of claim 7, the logic, when executed by the processor, further operable to:
receive information from one or more data sources;
for a factor of a plurality of factors for the political situation of the first region, calculate a risk associated with the factor for the political situation of the first region based on the received information and one or more of a plurality of risk rules, wherein the risk associated with the political situation of the first region is calculated based on risks associated with the plurality of factors for the political situation of the first region;
for a factor of a plurality of factors for the legal situation of the first region, calculate a risk associated with the factor for the legal situation of the first region based on the received information and the one or more of the plurality of risk rules, wherein the risk associated with the legal situation of the first region is calculated based on risks associated with the plurality of factors for the legal situation of the first region;
for a factor of a plurality of factors for the economic situation of the first region, calculate a risk associated with the factor for the economic situation of the first region based on the received information and the one or more of the plurality of risk rules, wherein the risk associated with the economic situation of the first region is calculated based on risks associated with the plurality of factors for the economic situation of the first region;
for a factor of a plurality of factors for the social situation of the first region, calculate a risk associated with the factor for the social situation of the first region based on the received information and the one or more of the plurality of risk rules, wherein the risk associated with the social situation of the first region is calculated based on risks associated with the plurality of factors for the social situation of the first region;
for a factor of a plurality of factors for the technological situation of the first region, calculate a risk associated with the factor for the technological situation of the first region based on the received information and the one or more of the plurality of risk rules, wherein the risk associated with the technological situation of the first region is calculated based on risks associated with the plurality of factors for the technological situation of the first region; and
for a factor of a plurality of factors for the environmental situation of the first region, calculate a risk associated with the factor for the environmental situation of the first region based on the received information and the one or more of the plurality of risk rules, wherein the risk associated with the environmental situation of the first region is calculated based on risks associated with the plurality of factors for the environmental situation of the first region.

9. The computer readable medium of claim 7, the logic, when executed by the processor, further operable to:
for a factor of a plurality of factors for the political situation of the first region, a selection of a risk associated with the factor for the political situation of the first region, wherein the risk associated with the political situation of the first region is calculated based on risks associated with the plurality of factors for the political situation of the first region;
for a factor of a plurality of factors for the legal situation of the first region, a selection of a risk associated with the factor for the legal situation of the first region, wherein the risk associated with the legal situation of the first region is calculated based on risks associated with the plurality of factors for the legal situation of the first region;
for a factor of a plurality of factors for the economic situation of the first region, a selection of a risk associated with the factor for the economic situation of the first region, wherein the risk associated with the economic situation of the first region is calculated based on risks associated with the plurality of factors for the economic situation of the first region;
for a factor of a plurality of factors for the social situation of the first region, a selection of a risk associated with the factor for the social situation of the first region, wherein the risk associated with the social situation of the first region is calculated based on risks associated with the plurality of factors for the social situation of the first region;
for a factor of a plurality of factors for the technological situation of the first region, a selection of a risk associated with the factor for the technological situation of the first region, wherein the risk associated with the technological situation of the first region is calculated based on risks associated with the plurality of factors for the technological situation of the first region; and
for a factor of a plurality of factors for the environmental situation of the first region, a selection of a risk associated with the factor for the environmental situation of the first region, wherein the risk associated with the environmental situation of the first region is calculated based on risks associated with the plurality of factors for the environmental situation of the first region.

10. The computer readable medium of claim 7, the logic, when executed by the processor, further operable to:

communicate a comparison of the risk associated with the political situation of the first region and the risk associated with the political situation of the second region for display;

communicate a comparison of the risk associated with the legal situation of the first region and the risk associated with the legal situation of the second region for display;

communicate a comparison of the risk associated with the economic situation of the first region and the risk associated with the economic situation of the second region for display;

communicate a comparison of the risk associated with the social situation of the first region and the risk associated with the social situation of the second region for display;

communicate a comparison of the risk associated with the technological situation of the first region and the risk associated with the technological situation of the second region for display; and communicate a comparison of the risk associated with the environmental situation of the first region and the risk associated with the environmental situation of the second region for display.

11. The computer readable medium of claim 7, the logic, when executed by the processor, further operable to display the comparison of the ranking for the first region and the ranking for the second region.

12. The computer readable medium of claim 11, wherein the comparison of the ranking for the first region and the ranking for the second region comprises a heat map.

13. A method, comprising:
for a first region:
calculating, using one or more processors, a risk associated with a political situation of the first region according to one or more of a plurality of calculation rules;
calculating, using the one or more processors, a risk associated with a legal situation of the first region according to the one or more of the plurality of calculation rules;
calculating, using the one or more processors, a risk associated with an economic situation of the first region according to the one or more of the plurality of calculation rules;
calculating, using the one or more processors, a risk associated with a social situation of the first region according to the one or more of the plurality of calculation rules;
calculating, using the one or more processors, a risk associated with a technological situation of the first region according to the one or more of the plurality of calculation rules;
calculating, using the one or more processors, a risk associated with an environmental situation of the first region according to the one or more of the plurality of calculation rules; and
for a first entity, calculating, using the one or more processors, a risk associated with an exposure level of the first entity in the first region according to the one or more of the plurality of calculation rules;
based at least on the calculated risks associated with the political situation, the legal situation, the economic situation, the social situation, the technological situation, and the environmental situation of the first region, and further based at least on the calculated risk associated with the exposure level of the first entity in the first region, calculating, using the one or more processors, a ranking for the first region according to a second one or more of the plurality of calculation rules, the ranking representing an amount of risk to the first entity in the first region; and
communicate, using the one or more processors, the ranking for the first region for display;
for a second region:
calculating, using the one or more processors, a risk associated with a political situation of the second region according to the one or more of the plurality of calculation rules;
calculating, using the one or more processors, a risk associated with a legal situation of the second region according to the one or more of the plurality of calculation rules;
calculating, using the one or more processors, a risk associated with an economic situation of the second region according to the one or more of the plurality of calculation rules;
calculating, using the one or more processors, a risk associated with a social situation of the second region according to the one or more of the plurality of calculation rules;
calculating, using the one or more processors, a risk associated with a technological situation of the second region according to the one or more of the plurality of calculation rules; and
calculating, using the one or more processors, a risk associated with an environmental situation of the second region according to the one or more of the plurality of calculation rules;
for the first entity, calculating, using the one or more processors, a risk associated with an exposure level of the first entity in the second region according to the one or more of the plurality of calculation rules;
based at least on the calculated risks associated with the political situation, the legal situation, the economic situation, the social situation, the technological situation, and the environmental situation of the second region, and further based at least on the calculated risk associated with the exposure level of the first entity in the second region, calculating, using the one or more processors, a ranking for the second region according to the second one or more of the plurality of calculation rules, the ranking representing an amount of risk to the first entity in the second region; and
communicating, using the one or more processors, a comparison of the ranking for the first region and the ranking for the second region for display.

14. The method of claim 13, further comprising:
receiving, using the one or more processors, information from one or more data sources;
for a factor of a plurality of factors for the political situation of the first region, calculating, using the one or more processors, a risk associated with the factor for the political situation of the first region based on the received information and one or more of a plurality of risk rules, wherein the risk associated with the political situation of the first region is calculated based on risks associated with the plurality of factors for the political situation of the first region;
for a factor of a plurality of factors for the legal situation of the first region, calculating, using the one or more processors, a risk associated with the factor for the legal situation of the first region based on the received information and the one or more of the plurality of risk rules, wherein the risk associated with the legal situation of the first region is calculated based on risks associated with the plurality of factors for the legal situation of the first region;

for a factor of a plurality of factors for the economic situation of the first region, calculating, using the one or more processors, a risk associated with the factor for the economic situation of the first region based on the received information and the one or more of the plurality of risk rules, wherein the risk associated with the economic situation of the first region is calculated based on risks associated with the plurality of factors for the economic situation of the first region;

for a factor of a plurality of factors for the social situation of the first region, calculating, using the one or more processors, a risk associated with the factor for the social situation of the first region based on the received information and the one or more of the plurality of risk rules, wherein the risk associated with the social situation of the first region is calculated based on risks associated with the plurality of factors for the social situation of the first region;

for a factor of a plurality of factors for the technological situation of the first region, calculating, using the one or more processors, a risk associated with the factor for the technological situation of the first region based on the received information and the one or more of the plurality of risk rules, wherein the risk associated with the technological situation of the first region is calculated based on risks associated with the plurality of factors for the technological situation of the first region; and for a factor of a plurality of factors for the environmental situation of the first region, calculating, using the one or more processors, a risk associated with the factor for the environmental situation of the first region based on the received information and the one or more of the plurality of risk rules, wherein the risk associated with the environmental situation of the first region is calculated based on risks associated with the plurality of factors for the environmental situation of the first region.

15. The method of claim 13, further comprising receiving, using the one or more processors:

for a factor of a plurality of factors for the political situation of the first region, a selection of a risk associated with the factor for the political situation of the first region, wherein the risk associated with the political situation of the first region is calculated based on risks associated with the plurality of factors for the political situation of the first region;

for a factor of a plurality of factors for the legal situation of the first region, a selection of a risk associated with the factor for the legal situation of the first region, wherein the risk associated with the legal situation of the first region is calculated based on risks associated with the plurality of factors for the legal situation of the first region;

for a factor of a plurality of factors for the economic situation of the first region, a selection of a risk associated with the factor for the economic situation of the first region, wherein the risk associated with the economic situation of the first region is calculated based on risks associated with the plurality of factors for the economic situation of the first region;

for a factor of a plurality of factors for the social situation of the first region, a selection of a risk associated with the factor for the social situation of the first region, wherein the risk associated with the social situation of the first region is calculated based on risks associated with the plurality of factors for the social situation of the first region;

for a factor of a plurality of factors for the technological situation of the first region, a selection of a risk associated with the factor for the technological situation of the first region, wherein the risk associated with the technological situation of the first region is calculated based on risks associated with the plurality of factors for the technological situation of the first region; and for a factor of a plurality of factors for the environmental situation of the first region, a selection of a risk associated with the factor for the environmental situation of the first region, wherein the risk associated with the environmental situation of the first region is calculated based on risks associated with the plurality of factors for the environmental situation of the first region.

16. The method of claim 13, further comprising:

communicating, using the one or more processors, a comparison of the risk associated with the political situation of the first region and the risk associated with the political situation of the second region for display;

communicating, using the one or more processors, a comparison of the risk associated with the legal situation of the first region and the risk associated with the legal situation of the second region for display;

communicating, using the one or more processors, a comparison of the risk associated with the economic situation of the first region and the risk associated with the economic situation of the second region for display;

communicating, using the one or more processors, a comparison of the risk associated with the social situation of the first region and the risk associated with the social situation of the second region for display;

communicating, using the one or more processors, a comparison of the risk associated with the technological situation of the first region and the risk associated with the technological situation of the second region for display; and communicating, using the one or more processors, a comparison of the risk associated with the environmental situation of the first region and the risk associated with the environmental situation of the second region for display.

17. The method of claim 13, further comprising displaying the comparison of the ranking for the first region and the ranking for the second region.

* * * * *